United States Patent [19]

Miyano

[11] Patent Number: 5,691,853
[45] Date of Patent: Nov. 25, 1997

[54] OBJECTIVE LENS FOR ENDOSCOPES

[75] Inventor: Hitoshi Miyano, Omiya, Japan

[73] Assignee: Fuji Photo Optical Co., Ltd., Saitama-ken, Japan

[21] Appl. No.: 539,605

[22] Filed: Oct. 5, 1995

[30] Foreign Application Priority Data

Oct. 5, 1994 [JP] Japan .................. 6-241168

[51] Int. Cl.$^6$ .................. G02B 9/00; G02B 7/02; G02B 5/00
[52] U.S. Cl. .................. 359/740; 359/830; 359/894
[58] Field of Search .................. 359/738, 739, 359/740, 830, 894

[56] References Cited

U.S. PATENT DOCUMENTS

| | | | |
|---|---|---|---|
| 4,015,897 | 4/1977 | Konoma et al. | 359/740 |
| 4,902,115 | 2/1990 | Takahashi | 359/40 |
| 5,353,164 | 10/1994 | Sasian-Alvarado | 359/791 |
| 5,416,638 | 5/1995 | Broome | 359/656 |

*Primary Examiner*—David C. Nelms
*Assistant Examiner*—Jordan M. Schwartz
*Attorney, Agent, or Firm*—Young & Thompson

[57] ABSTRACT

An objective lens for an endoscope has an optical lens system including a plurality of optical lens elements coaxially arranged at predetermined axial distances, at least an adjacent two of which are spaced at a specified relative axial distance by a thin ring member for restricting light rays entering the optical system.

12 Claims, 2 Drawing Sheets

OBJECTIVE LENS FOR ENDOSCOPES

BACKGROUND OF THE INVENTION

1. Field of the Invention

The present invention relates to an objective lens for an endoscope of the type having a plurality of lens elements coaxially arranged with axial spacing.

2. Description of Related Art

Objective lenses for endoscopes, in particular medical endoscopes, typically consist of a plurality of lens elements which are coaxially arranged at axial distances in a lens barrel. Such an objective lens makes utilization of spacer members such as spacer rings 101–104 shown in FIG. 2, each of which holds each adjacent lens elements at a desired axial distance in a lens barrel and places its related lenses elements in desired relative axial position.

Objective lenses for use with endoscopes include optical lens components which have outer diameters desirably as small as possible. In order for such an objective lens to place these tiny optical lens components at desired relative axial positions, mechanical components, such as spacer rings, must be accurate in shape and size. Faulty relative axial positions of the optical lens components leads to significant aggravation of fundamental optical performances of the optical lens system and, consequently, the endoscope. In particular, in quantity production of endoscopes, variations in axial thickness of spacer rings require adjustment of respective objective lens systems for desired optical performances.

Axially thick spacer rings produce surface reflection along their inner wall defining openings, causing flare which is always undesirable.

The objective lens for endoscopes needs another optical component, such as an aperture stop, which increases the number of parts, assembling processes and manufacturing costs.

OBJECTS OF THE INVENTION

It is, therefore, an object of the present invention of the present invention to provide an objective lens for medical endoscopes which prevents an occurrence of flare.

It is another object of the present invention to provide an objective lens for medical endoscopes which has a high performance and a reduction in manufacturing costs.

SUMMARY OF THE INVENTION

These objects of the present invention are achieved by providing an objective lens for an endoscope having an optical lens system whose optical lens elements are spaced coaxially at predetermined axial distances by thin aperture rings in place of spacer rings. The thin aperture rings, such as an aperture stop ring, is disposed between an adjacent two of the lens elements for restricting light rays entering the optical system and positions the adjacent two lens elements at a specified axial distance.

By the term "aperture ring" is meant a ring that has an aperture less than the diameter of an adjacent lens element and that accordingly reduces the effective diameter of the lens element. One of the aperture rings will be an aperture stop ring that determines the speed of the lens system.

Specifically, the aperture ring has a thickness sufficiently small to cause only negligible surface reflection along the inner wall defining the aperture. It is appropriate for the aperture ring to have a thickness less than approximately 0.1 mm, preferably between 0.02 and 0.08 mm or more desirably between 0.03 and 0.05 mm. Thickness less than 0.02 mm renders quantity production of aperture rings difficult to be well controlled. The size of aperture of the aperture stop ring is determined according to required optical characteristics of the objective lens, such as a lens speed. The aperture ring serves as a mechanical member or spacer ring in holding the lens elements $L_1$–$L_3$ in the desired relative axial position in addition to performing their essential optical functions.

With the objective lens for endoscopes of the present invention, since an aperture opening of the thin aperture ring is formed by photoresist etching, although the thin aperture rings are tiny parts, they can be produced uniformly in thickness even in quantity production, following which there does not occur variation in the fundamental optical performances among the objective lenses. Because the aperture rings are formed very thin and uniform in thickness and have sharp edge profiles of their apertures, they prevent surface reflection along the inner wall surfaces defining the apertures which is similar to the effect of an optical knife edge. This prevents the objective lenses from producing flare which always adversely affects forming clear images of internal organs.

Further, the aperture ring serves as an important mechanical element such as a spacer ring, to hold the lens elements in the desired relative axial position in addition to performing their essential optical functions. Consequently, the objective lens avoids the necessity of special spacer rings for positioning lens elements, resulting in a reduced number of optical and mechanical parts and cost reduction. Of course details of the thin aperture rings may be determined so that the objective lens having the thin aperture rings satisfies required optical performances when incorporated in endoscopes.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

Figure 1:
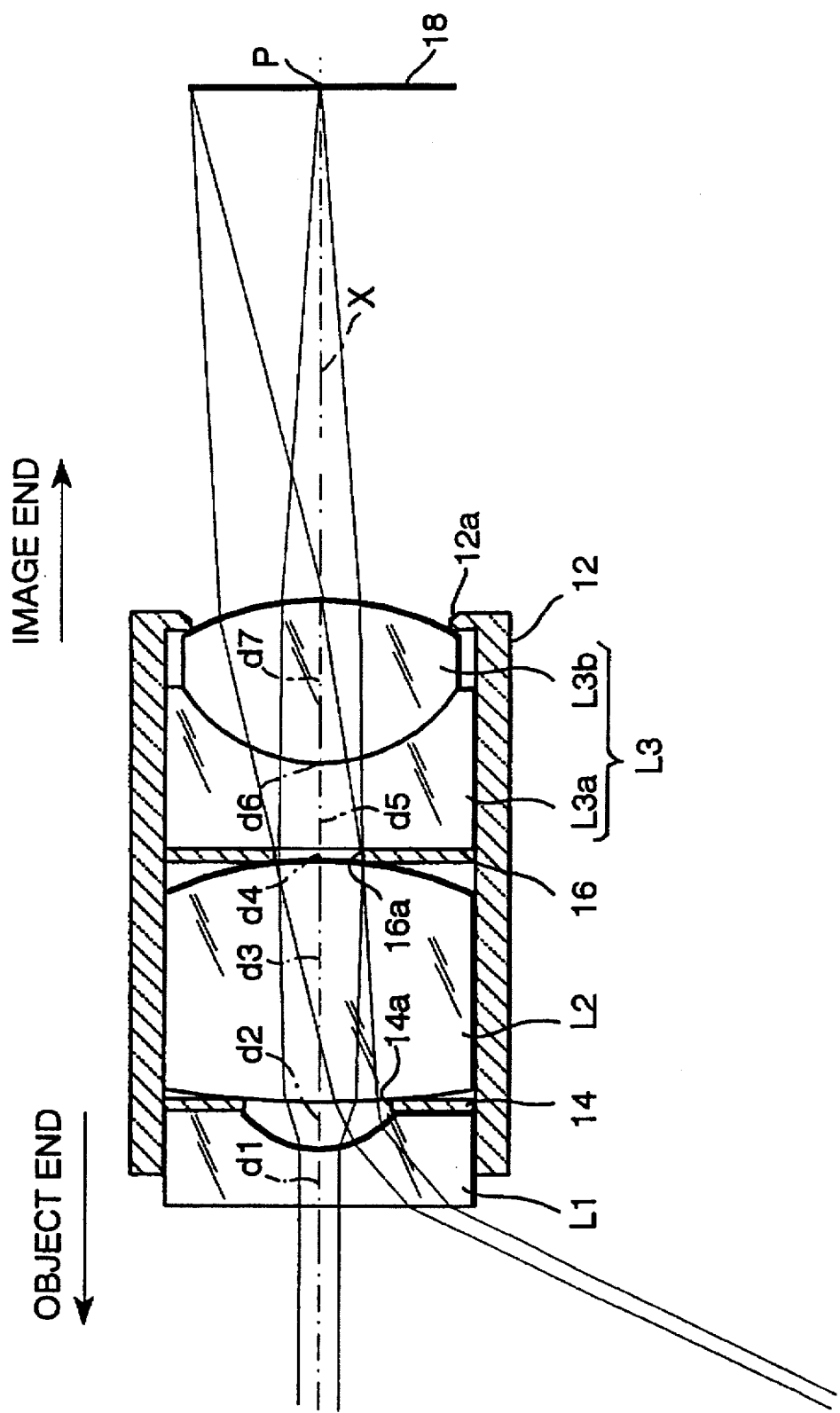
FIG. 1 is a side cross-sectional view of an objective lens for an endoscope in accordance with an embodiment of the present invention.
Figure 2:
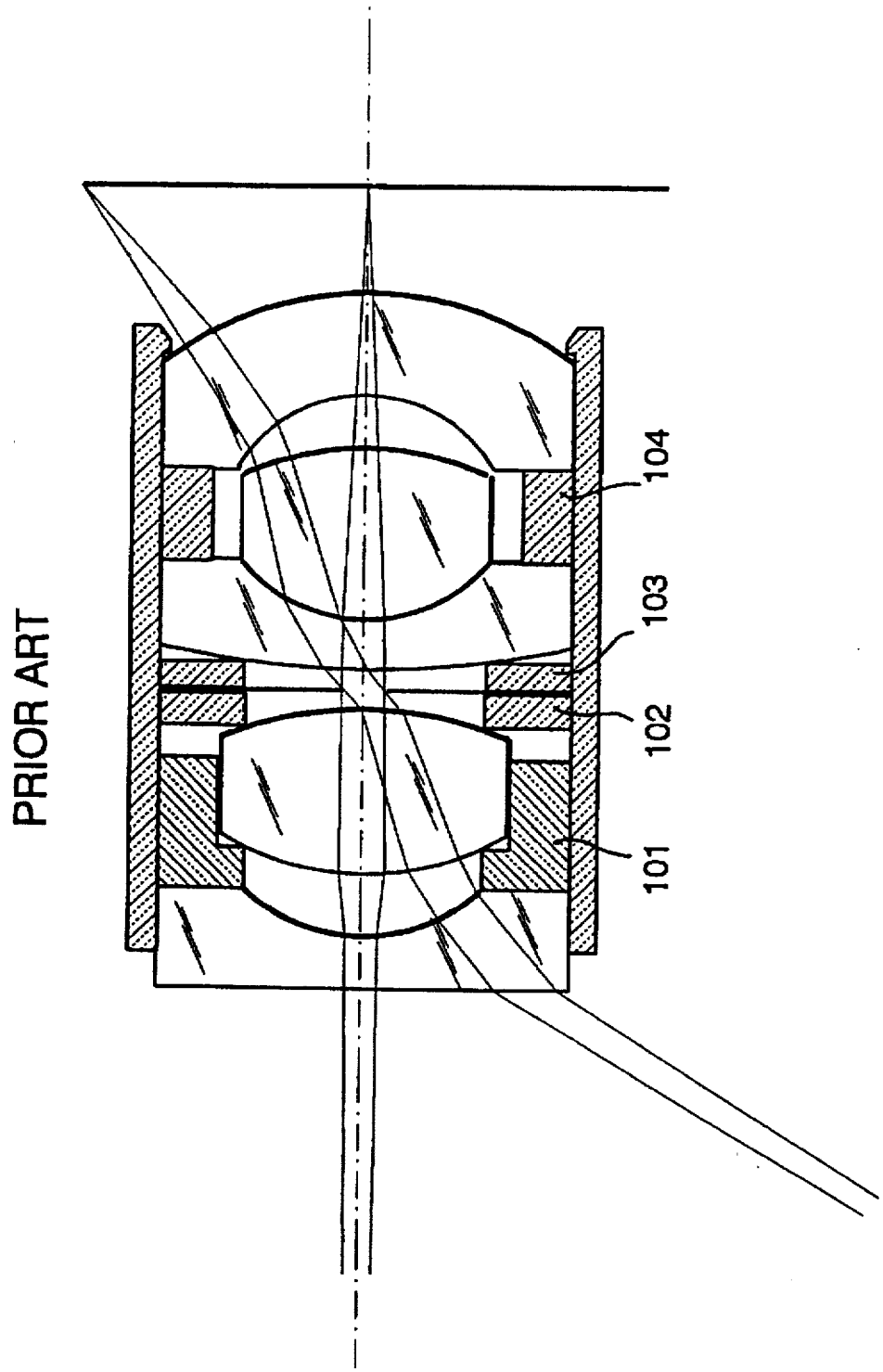
FIG. 2 is a side cross-sectional view of a prior art objective lens for an endoscope.

Referring now to FIG. 1 showing an objective lens for endoscopes in accordance with a preferred embodiment of the present invention, the objective lens comprises an optical lens system including three lens elements, namely a first lens element $L_1$, a second lens element $L_2$ and a third lens element $L_3$, arranged, in order from the object end toward the image end, at given axial distances in a lens barrel 12. The objective lens focuses light rays parallel to the optical axis X on a CCD image plane 18 at a point P on the optical axis X.

The objective lens comprises, from the object end to the image end, a plano-concave lens element $L_1$ which is a negative singlet with a concave image side surface, a bi-convex lens element $L_2$ which is a positive singlet with an image end surface of strong curvature, and a third lens element $L_3$ which is a plano-convex positive doublet comprising two components cemented together, a negative plano-concave singlet $L_{3a}$ having a concave image end surface and a positive bi-convex singlet $L_{3b}$ having a bi-convex image end surface of strong curvature. The lens elements $L_1$–$L_{3a}$ have outer diameters of approximately 2 mm, and the lens element $L_{3b}$ has an outer diameter less than the inner diameter of the lens barrel 12. The lens system is installed and tightly fitted in the lens barrel 12 having an inner diameter approximately the same as the outer diameters of the lens elements $L_1$–$L_{3a}$. The lens barrel 12 is formed with an annular flange 12a against which the bi-convex singlet component $L_{3b}$ abuts and is positioned in axial direction when the lens system is installed into the lens barrel 12. All these lens elements or components $L_1$–$L_{3b}$ are in fixed relation.

The lens system further includes an aperture ring 14 with an opening 14a disposed and tightly sandwiched between the first and second lens elements $L_1$ and $L_2$ and an aperture stop ring 16 with an aperture opening 16a is disposed and tightly sandwiched between the second and third lens elements $L_2$ and $L_3$. The light aperture ring 14 shuts off undesirable light rays entering the lens system 10. By the diameter of the aperture stop ring 16 the lens speed of the lens system is determined.

The following examples in tables are exemplary of a lens system embodying the invention. In the following prescription tables, the reference L followed by an arabic numeral indicates the lens elements progressively from the object end to the image end of the lens. The reference radius numbers r are the progressive lens surface radii. Positive surface radii are struck from the right of the lens surface on the optical axis X. Negative radii are struck from the left of the lens surface on the optical axis X. $N_d$ is the index of refraction of the lens element. $\gamma_d$ is the dispersion of the lens element as measured by the Abbe number. The reference distance numbers d are the progressive axial distances between adjacent lens surfaces.

A lens system as shown in FIG. 1 is substantially described in Table I.

TABLE I

| Element | Radius of Curvature (mm) | Axial Distance Between Surfaces | $N_d$ | $v_d$ |
|---|---|---|---|---|
| $L_1$ | $r_1 = \infty$ | $d_1 = 0.40$ | 1.88299 | 40.9 |
|  | $r_2 = 0.8313$ | $d_2 = 0.37$ |  |  |
| $L_2$ | $r_3 = 9.2893$ | $d_3 = 1.78$ | 1.80517 | 25.4 |
|  | $r_4 = -1.9212$ | $d_4 = 0.02$ |  |  |
| $L_{3a}$ | $r_5 = \infty$ | $d_5 = 0.40$ | 1.80517 | 25.4 |
|  | $r_6 = 1.022$ | $d_6 = 0$ |  |  |
| $L_{3b}$ | $r_7 = 1.022$ | $d_7 = 1.18$ | 1.69680 | 55.6 |
|  | $r_8 = -1.7585$ |  |  |  |

As shown in FIG. 1, the lens system described in Table I provides an angle of view sufficiently wide for endoscopes.

With the parameters of the lens system in the above prescription table, the aperture size is set forth to be approximately 1.30 mm for the aperture ring 14 and 0.65 mm for the aperture stop ring 16. Each of these rings 14 and 16 is made of, for instance, a stainless steel sheet having a thickness of 0.03 mm and is finished 0.05 mm in thickness after being painted black. The aperture stop ring 16 with a thickness of 0.05 mm and an inner diameter of 0.65 mm places the second and third lens elements $L_1$ and $L_2$ at a given axial distance of 0.02 mm.

These rings 14 and 16 are fabricated precisely, in particular uniformly in thickness, and sharply in edge profile of their apertures 14a and 16a from a sheet material making utilization of photoresist etching, although they are very tiny and thin. Therefore, the aperture rings 14 and 16 incorporated therein locate the respective lens elements $L_1$–$L_3$ in accurate relative axial positions in the lens system, so as to eliminate aggravation of fundamental optical performances essential for endoscopes. In quantity production, in particular, there does not occur variation in the fundamental optical performances among the lens systems.

In addition, because of the thinness of these aperture rings 14 and 16, there is almost no surface reflection by inner walls defining the openings 14a and 16a, yielding effects of reflection prevention, such as those of a knife edge. That is, the lens system does not produce flare which always adversely affects clear image forming.

As will be understood from the above, in the lens system, the aperture rings 14 and 16 serve as important mechanical elements such as spacer rings, to hold the lens elements $L_1$–$L_3$ in the desired relative axial position in addition to their essential optical functions. This avoids the necessity of special spacer rings for positioning, resulting in a reduced number of optical and mechanical parts of the lens system and a cost reduction.

The spacing function of the aperture rings 14 and 16 is generally desirable, but it is a consideration, and not an absolute function in the lens design. For example, the aperture rings 14 and 16 made of a sheet material with a finished thickness of 0.05 mm may have inner diameters of 1.00 and 0.30 mm for a lens system substantially described in the following prescription Table II.

TABLE II

| Element | Radius of Curvature (mm) | Axial Distance Between Surfaces | $N_d$ | $v_d$ |
|---|---|---|---|---|
| $L_1$ | $r_1 = \infty$ | $d_1 = 0.40$ | 1.88299 | 40.9 |
|  | $r_2 = 0.7772$ | $d_2 = 0.33$ |  |  |
| $L_2$ | $r_3 = 3.5183$ | $d_3 = 1.75$ | 1.80517 | 25.4 |
|  | $r_4 = -1.4831$ | $d_4 = 0.02$ |  |  |
| $L_{3a}$ | $r_5 = \infty$ | $d_5 = 0.40$ | 1.80517 | 25.4 |
|  | $r_6 = 1.9530$ | $d_6 = 0$ |  |  |
| $L_{3b}$ | $r_7 = 1.9530$ | $d_7 = 1.18$ | 1.69680 | 55.6 |
|  | $r_8 = -1.7595$ |  |  |  |

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An objective lens for an endoscope which has an optical lens system including a plurality of optical lens elements arranged at predetermined axial distances, said objective lens system comprising:

a lens barrel in which said optical lens elements are coaxially placed; and an aperture ring disposed between an adjacent two of said lens elements for restricting light rays entering said optical system and positioning said adjacent two lens elements at a specified axial distance; said aperture ring having an aperture having a marginal edge, said marginal edge being in contact with both of said adjacent two lens elements; said aperture ring having a thickness less than approximately 0.1 mm.

2. An objective lens for an endoscope as defined in claim 1, wherein said aperture ring is made of a sheet metal having a thickness less than 0.1 mm.

3. An objective lens for an endoscope as defined in claim 1, wherein said aperture ring is made of a sheet metal having a thickness between 0.02 and 0.08 mm.

4. An objective lens for an endoscope as defined in claim 1, wherein said aperture ring is made of a sheet metal having a thickness between 0.03 and 0.05 mm.

5. An objective lens for an endoscope as defined in claim 1, wherein said aperture ring is an aperture stop ring.

6. An objective lens for an endoscope which has an optical lens system including from the object end to the image end first, second and third optical lens elements $L_1$–$L_3$ coaxially arranged at axial distances in a lens barrel and an aperture stop ring member disposed between said second and third optical lens elements for restricting light rays entering said optical system and positioning said second and third optical lens elements at a specified axial distance, said third optical lens element $L_{3a}$ and $L_{3b}$ cemented together, and said optical lens system being substantially described as follows:

TABLE II

| Element | Radius of Curvature (mm) | Axial Distance Between Surfaces | $N_d$ | $v_d$ |
|---|---|---|---|---|
| $L_1$ | $r_1 = \infty$ | | | |
| | | $d_1 = 0.40$ | 1.88299 | 40.9 |
| | $r_2 = 0.7772$ | | | |
| | | $d_2 = 0.23$ | | |
| $L_2$ | $r_3 = 3.5183$ | | | |
| | | $d_3 = 1.75$ | 1.80517 | 25.4 |
| | $r_4 = -1.4831$ | | | |
| | | $d_4 = 0.02$ | | |

TABLE II-continued

| Element | Radius of Curvature (mm) | Axial Distance Between Surfaces | $N_d$ | $v_d$ |
|---|---|---|---|---|
| $L_{3a}$ | $r_5 = \infty$ | | | |
| | | $d_5 = 0.40$ | 1.80517 | 25.4 |
| | $r_6 = 1.9530$ | | | |
| | | $d_6 = 0$ | | |
| $L_{3b}$ | $r_7 = 1.9530$ | | | |
| | | $d_7 = 1.18$ | 1.69680 | 55.6 |
| | $r_8 = -1.7595$ | | | | wherein the lens elements $L_1$–$L_{3b}$ have surface radii $r_1$–$r_8$, the index of refraction is given by $N_d$, the dispersion is measured by the Abbe number as given by $V_d$, and the axial distance between adjacent surface is given by d in millimeters (mm).

7. An objective lens for an endoscope as defined in claim 6, further comprising an aperture disposed between said first and second optical lens elements for restricting light rays entering said optical system and positioning said first and second optical lens elements at a specified axial distance.

8. An object ire lens for an endoscope as defined in claim 6, wherein said aperture stop ring member has a thickness less than approximately 0.1 mm.

9. An objective lens for an endoscope as defined in claim 6, wherein said aperture stop ring member is made of a sheet metal having a thickness less than 0.1 mm.

10. An objective lens for an endoscope as defined in claim 6, wherein said aperture stop ring member is made of a sheet metal having a thickness between 0.02 and 0.08 mm.

11. An objective lens for an endoscope as defined in claim 6, wherein said aperture stop ring member is made of a sheet metal having a thickness between 0.03 and 0.05 mm.

12. An objective lens for an endoscope as defined in claim 6, wherein said aperture stop ring has an aperture having a marginal edge that is in contact with both of said second and third optical lens elements.

* * * * *